United States Patent
Kato et al.

(10) Patent No.: US 8,271,131 B2
(45) Date of Patent: Sep. 18, 2012

(54) ROBOT WITH LEARNING CONTROL FUNCTION

(75) Inventors: Tetsuaki Kato, Minamitsuru-gun (JP); Masakazu Ichinose, Minamitsuru-gun (JP); Soichi Arita, Minamitsuru-gun (JP); Kiyonori Inaba, Minamitsuru-gun (JP); Hajime Suzuki, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 38 days.

(21) Appl. No.: 13/029,641

(22) Filed: Feb. 17, 2011

(65) Prior Publication Data

US 2011/0208354 A1 Aug. 25, 2011

(30) Foreign Application Priority Data

Feb. 19, 2010 (JP) ................................. 2010-034787

(51) Int. Cl.
*G05B 19/04* (2006.01)

(52) U.S. Cl. ...................................................... 700/246

(58) Field of Classification Search .......... 700/245–246, 700/250, 253–254, 258, 264; 901/1, 3, 8–9, 901/14, 50
See application file for complete search history.

(56) References Cited

U.S. PATENT DOCUMENTS

| | | | | |
|---|---|---|---|---|
| 6,167,328 A | * | 12/2000 | Takaoka et al. | 700/264 |
| 6,522,949 B1 | * | 2/2003 | Ikeda et al. | 700/245 |
| 7,205,743 B2 | | 4/2007 | Iwashita et al. | |
| 7,996,110 B2 | * | 8/2011 | Lipow et al. | 700/245 |
| 8,170,719 B2 | * | 5/2012 | Tsusaka et al. | 700/257 |
| 8,175,749 B2 | * | 5/2012 | Tsusaka et al. | 700/254 |
| 2009/0125146 A1 | * | 5/2009 | Zhang et al. | 700/253 |

FOREIGN PATENT DOCUMENTS

| | | |
|---|---|---|
| JP | 2006-172149 | 6/2006 |
| JP | 2009-83074 | 4/2009 |
| JP | 2009238164 A | 10/2009 |

* cited by examiner

*Primary Examiner* — Khoi Tran
*Assistant Examiner* — Harry Oh
(74) *Attorney, Agent, or Firm* — Drinker Biddle & Reath LLP (57) ABSTRACT

A robot with a learning control function is disclosed. The robot includes a robot mechanism unit, a learning control unit for obtaining data on positional deviation of the robot mechanism unit upon execution of a task program and executing a learning control for calculating a learning correction amount in order to decrease the positional deviation of the robot mechanism unit below a certain value, a normal control unit for executing a learning operation of the robot mechanism unit in order to obtain the data during the learning control and executing an actual operation of the robot mechanism unit based on the learning correction amount calculated by the learning control unit after executing the learning control, and an anti-exception processing unit for executing an anti-exception process in the case where an exception process occurs during the learning operation or the actual operation.

8 Claims, 12 Drawing Sheets

L P[1]　FINE
　　LVC START[1]
L P[1]　FINE SPOT
L P[2]　CNT100
L P[3]　FINE SPOT
　　LVC END[1]
J P[4]　FINE
　　LVC START[2]
L P[4]　CNT100
L P[5]　CNT100 SPOT
L P[6]　FINE SPOT
　　LVC END[2]
L P[1]　FINE
[END]

ROBOT WITH LEARNING CONTROL FUNCTION

This application is a new U.S. patent application that claims benefit of JP 2010-034787, filed Feb. 19, 2010, the content of 2010-034787 incorporated herein by reference.

FIELD OF THE INVENTION

This invention relates to a robot with a learning control function and in particular an industrial robot including a control unit having the learning control function.

BACKGROUND OF THE INVENTION

A learning control function, though not commercially realized in robots, has come to find practical application in machine tools (see, for example, Patent Documents 1 and 2).

The learning control will be briefly explained. Learning control is defined as control of the optimization of the feedforward signal for the same operation. By repeating the same operation, the feedforward signal is updated, and results in a certain value (Variation by updating is relatively small.). Then, after the learning is finished, the feedforward signal obtained by learning control is used as it is without being updated. In a specific update process, a given operation of a robot mechanism unit is performed first by executing a task program for operating the robot mechanism unit using a given operating parameter, and during this operation, positional deviation data (for example, the vibration amount and the trajectory error amount) are measured by sensors, etc. Upon completion of this operation, the correction amount (learning correction amount) for the next operation parameter is calculated from the data. The next operation is performed while using the learning operation thus calculated while at the same time measuring the vibration amount and the trajectory error amount. Upon completion of this operation, the learning correction amount for the second next operation parameter is calculated from the learning correction amount and the measurement data obtained in the preceding operation. This process is repeated until the learning correction amount becomes a certain value and positional deviation decrease below a certain value, and the learning control is performed. After completion of the learning control, the operation (actual operation) is performed using the derived learning correction amount finally without measuring the vibration amount and the trajectory error amount. Also, after completion of the operation, the learning correction amount is not updated, and the same learning correction amount is used for the next operation. In the description of the invention that follows, operation for obtaining data regarding positional deviation of a robot mechanism unit and calculating a learning correction amount for decreasing positional deviation of the robot mechanism unit below a certain value is referred to as "the learning control", operation for operating a robot mechanism unit in order to obtain the above data is referred to as "the learning operation", and operation of a robot mechanism unit based on a learning correction amount calculated by a learning control unit is referred to as "the actual operation".

Figure 1:
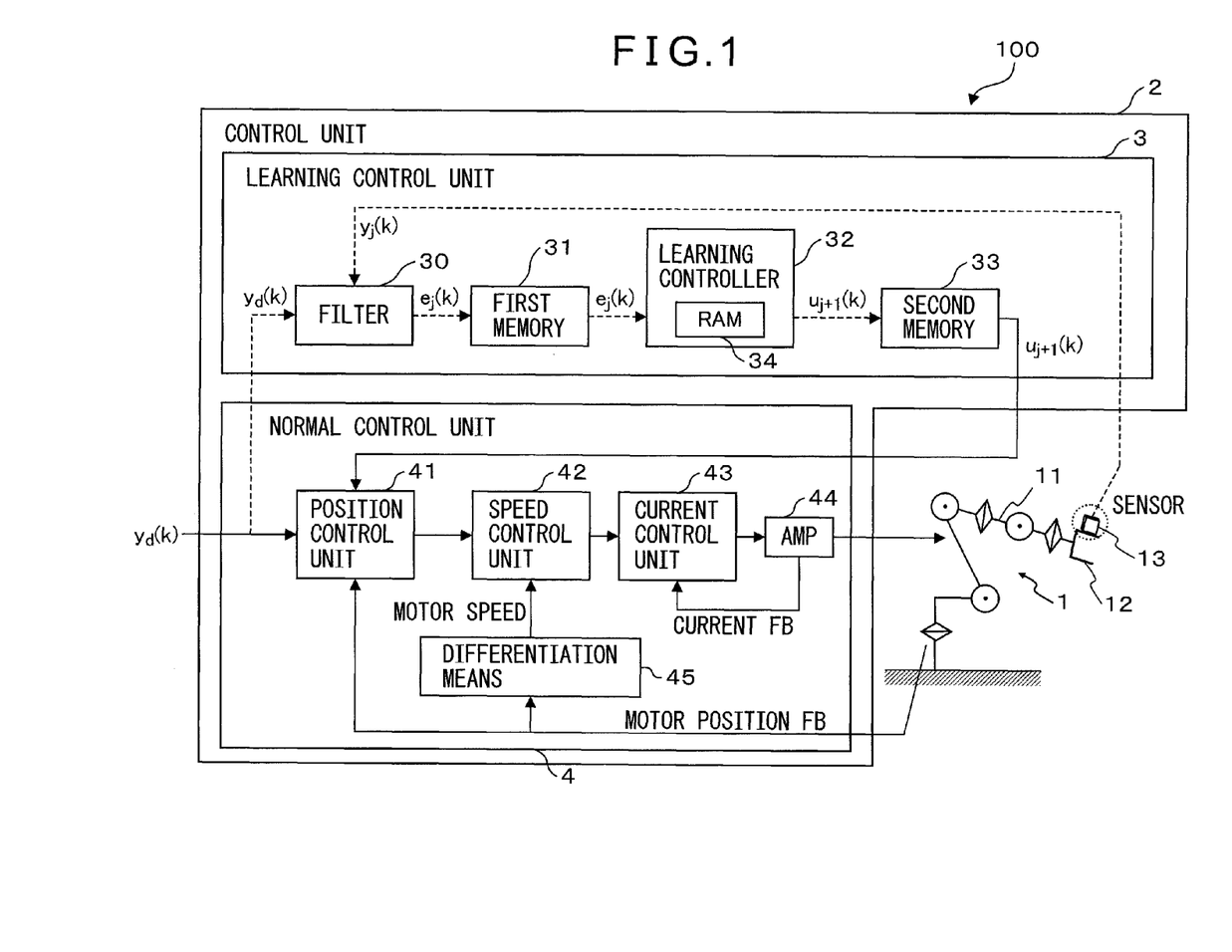
FIG. 1 is a diagram showing the configuration of the conventional robot with a learning control function.

A schematic diagram of a conventional robot (a learning controlled robot) with a learning controller function is shown in FIG. 1. A robot 100 is configured of a robot mechanism unit 1, and a control unit 2 for controlling the robot mechanism unit 1. The control unit 2 includes a learning control unit 3 for carrying out the learning control of the robot and a normal control unit 4 for driving the robot mechanism unit 1 directly.

The robot mechanism unit 1 has an arm 11, an arm forward end portion 12, a stereo sensor 13 and a motor (not shown). The motor of the robot mechanism unit 1 is supplied with a signal from the normal control unit 4 included in the control unit 2. The motor of the robot mechanism unit 1 drives the arm 11, and by moving the forward arm end portion 12 to the desired position, carries out the task such as welding. The stereo sensor 13 is installed on the forward arm end portion 12 and can obtain the spatial position data ($y_j(k)$) of the arm forward end portion 12. The position data ($y_j(k)$) from the stereo sensor 13 is output to the learning control unit 3 and used for learning control. In the position data ($y_j(k)$), j designates the number of times trials that are made, and k the time.

The normal control unit 4 includes a position control unit 41, a speed control unit 42, a current control unit 43, an amplifier 44 and a differentiation means 45. The position control unit 41 receives the position command data ($j_d(k)$) input externally of the control unit 2. The position control unit 41 further receives the data on the motor position of the robot mechanism unit 1 and outputs the desired position data of the forward arm end portion 12 of the robot mechanism unit 1 to the speed control unit 42. The differentiation means 45 receives the motor position data fed back from the robot mechanism unit 1, and by calculating the motor speed, outputs the resulting motor speed to the speed control unit 42.

The speed control unit 42 calculates the desired motor speed taking the position data from the position control unit 41 and the motor speed data from the differentiation means 45 into consideration, and outputs the calculation result to the current control unit 43. The current control unit 43, while receiving the current value fed back from the amplifier 44, calculates the current supplied to the motor in such a manner as to achieve the desired motor speed input from the speed control unit 42, and outputs the calculated current to the amplifier 44. The amplifier 44 calculates the desired power based on the current value from the current control unit 43, and charges the desired power in the motor (not shown) of the robot mechanism unit 1.

The learning control unit 3 includes a first memory 31, a learning controller 32, a second memory 33 and a RAM 34. The first memory 31 is supplied with and stores a target correction amount $e_j(k)$ through a filter 30 based on the position command data ($y_d(k)$) for the arm forward end portion 12 and the position data ($y_j(k)$) measured by the stereo sensor 13. At the same time, the target correction amount $e_j(k)$ is output to the learning controller 32. Incidentally, the target correction amount $e_j(k)$ corresponds to an error from the desired position of the arm forward end portion 12.

The learning controller 32 executes a learning control for calculating a learning correction amount in order to decrease a positional deviation of the robot mechanism unit by carrying out the task program stored in the RAM 34 built in the learning controller 32. The learning controller 32, by carrying out the task program, calculates the learning correction amount $u_{j+1}(k)$ from the learning correction amount $u_j(k)$ for the preceding trial and the target correction amount $e_j(k)$ stored in the RAM 34, and outputs the learning correction amount $u_{j+1}(k)$ to the second memory 33 and the RAM 34. The learning correction amount $u_{j+1}(k)$ input to the second memory 33 is stored in the second memory 33 while at the same time being added to the positional deviation data calculated by the position control unit 41 of the normal control unit 4.

Based on the positional deviation data thus corrected, the robot mechanism unit 1 is controlled and the learning control is repeated. In the learning control, this series of processes is repeatedly executed and the positional deviation is converged to a certain value, preferably "0". After the end of the learning control, i.e., during the actual operation, the learning correction amount updating loop indicated by the dotted line in FIG. 1 is not carried out, and the learning correction amount $u_{j+1}(k)$ is output to the position control unit 41 from the second memory 33. Incidentally, in FIG. 1, the solid lines indicate the process executed when the normal control unit 4 activates the robot mechanism unit 1 during a learning operation or an actual operation, and process for calculating a learning correction amount in the learning control indicated by the dotted lines is executed after the learning operation.

Patent Document 1: JP-A-2009-83074
Patent Document 2: JP-A-2006-172149

The conventional learning control technique has the problem of being narrow and not sufficiently taken into consideration in actual use. Specifically, the learning control assumes that the same operation is repeated. In the case where the operation not assumed by the learning control is performed in the learning operation or the actual operation (for example, the provisional stop, or the change in speed override, hereinafter referred to as the "exception" or "exception process"), therefore, the learning correction amount may deteriorate the operation. In particular, in the case where the operation speed is high, the robot mechanism unit may develop vibration.

The object of this invention is to provide a protective (anti-exception) means and a relearning method in the case where an exception process occurs when executing the learning operation or the actual operation of a robot with a learning control function.

SUMMARY OF THE INVENTION

The robot with a leaning control function according to this invention comprises a robot mechanism unit, a learning control unit for obtaining data on positional deviation of the robot mechanism unit upon execution of a task program and executing a learning control for calculating a learning correction amount for decreasing the positional deviation of the robot mechanism unit below a certain value, a normal control unit for executing a learning operation for operating the robot mechanism unit in order to obtain the data during the learning control and executing an actual operation for operating the robot mechanism unit based on the learning correction amount calculated by the learning control unit after executing the learning control, and an anti-exception processing unit for executing an anti-exception process in the case where an exception process occurs during the learning operation or the actual operation.

Further, the anti-exception process may be a process for decreasing operation speed of the robot mechanism unit to a predetermined safe speed and setting the learning correction amount to zero.

An example of the exception process is the teaching correction process to the task program.

Another example of the exception process is provisional stopping process of the learning operation or the actual operation.

Still another example of the exception process is resuming process of the learning operation or the actual operation after provisional stop.

Yet another example of the exception process is the changing process of speed override during the learning operation or the actual operation.

Also, the anti-exception process may not be executed in the case where the spatial position of the robot mechanism unit after the teaching correction process exists in a predetermined area with reference to the spatial position of the robot mechanism unit before the teaching correction process.

The predetermined area described above is desirably defined by a solid including an ellipsoid, a sphere, a parallelepiped, a cube or a polyhedron with the center thereof located at a position before the teaching correction process.

The learning control unit may further include a relearning control unit for executing the learning control again and recalculating the learning correction amount.

According to this invention, in the case where an exception occurs during execution of the learning operation or the actual operation of the robot with a learning control function, safety can be improved by executing the anti-exception process. Examples of the exception process include the teaching correction of the task program for controlling the robot with a learning control function, the provisional stop of the robot mechanism unit or the resumption of the operation after the provisional stop and the change in the speed override in the speed control unit Further, according to this invention, in the case where an exception occurs, the anti-exception processing unit in the robot control unit decreases the operation speed of the robot mechanism unit to a safe rate as a process against the exception, while at the same time setting the learning correction amount due to the learning control to zero for improved safety.

BRIEF DESCRIPTION OF THE DRAWINGS

These and other features and advantages of the prevent invention will be better understood by referring the following detailed description together with the drawings wherein.

DETAILED DESCRIPTION OF THE PREFERRED EMBODIMENTS

The robot with a learning control function according to the invention is explained below with reference to the drawings. However, it should be noted that the technical scope of the invention is not limited to the embodiments described below and covers the invention described in the scope of claim and equivalents thereof.

Embodiment 1

Figure 2:
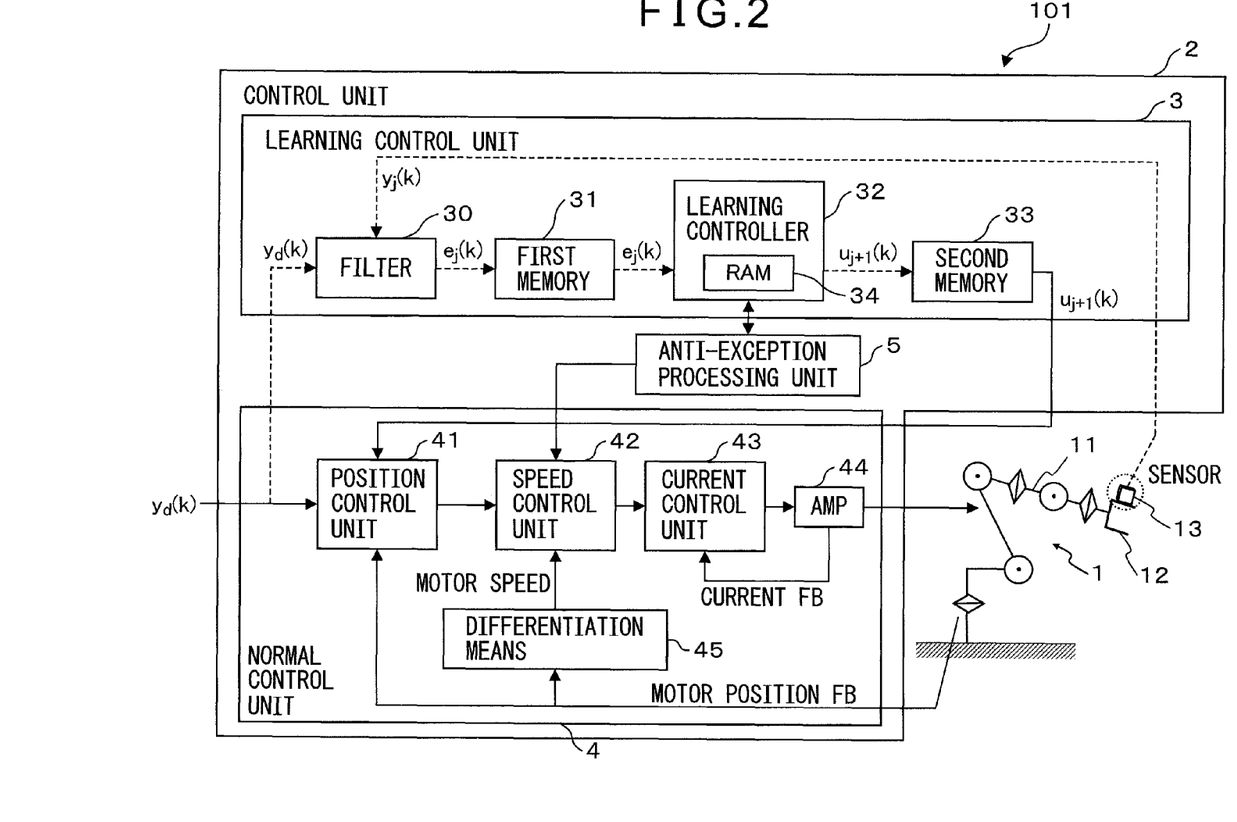
FIG. 2 is a diagram showing the configuration of the robot with a learning control function according to a first embodiment of the invention.

The configuration of the robot with a learning control function according to a first embodiment of the invention is shown in FIG. 2. The robot with a learning control function 101 according to the first embodiment of the invention includes a robot mechanism unit 1, a learning control unit 3 for obtaining data on positional deviation of the robot mechanism unit 1 upon execution of a task program and executing a learning control for calculating a learning correction amount for decreasing the positional deviation of the robot mechanism unit 1 below a certain value and a normal control unit 4 for executing a learning operation of the robot mechanism unit 1 in order to obtain the data during the learning control and executing an actual operation of the robot mechanism unit 1 based on the learning correction amount calculated by the learning control unit 2 after executing the learning control. The configuration of this robot with a learning control function is different from that of the conventional robot shown in FIG. 1 in that this embodiment further includes an anti-exception processing unit 5 in a control unit 2. According to the first embodiment, the anti-exception processing unit 5 determines that an exception has occurred and executes the anti-exception process in the case where the teaching correction is executed for the task program stored in a RAM 34 in a learning controller 32 during execution of a learning operation or an actual operation of the robot mechanism unit 1. The "anti-exception process" is defined as the operation to set the robot with a learning control function in a safe state in the case where an exceptional process is executed on the robot with a learning control function. In such a case, for example, the operation speed of the robot mechanism unit is decreased to a predetermined safe speed and the learning correction amount is set to zero. Specifically, the anti-exception processing unit 5, by controlling a speed control unit 42, decreases the operation speed of the robot mechanism unit to a safe rate while at the same time setting the learning correction amount in the RAM 34 and a second memory 33 to zero.

The learning control unit 3 obtains data on positional deviation of the robot mechanism unit 1 in a memory 31 by executing the task program and executes a learning control for calculating a learning correction amount in order to decrease positional deviation below a certain value. And the learning control unit 3 sends the calculated learning correction amount to a position control unit 41 of the normal control unit 4. The normal control unit 4, on the other hand, controls the learning operation or the actual operation, as the case may be, of the robot mechanism unit 1 based on the learning correction amount thus far calculated by the learning control unit 3. The anti-exception processing unit 5 constantly monitors the content of the task program. In the case where the task program is corrected with the teaching corrected in such a manner as to induce an abnormal operation of the robot with a learning control function, the speed control unit 42 of the normal control unit 4 is controlled while at the same time setting the learning correction amount to zero in the RAM 34 and the second memory 33.

Figure 3:
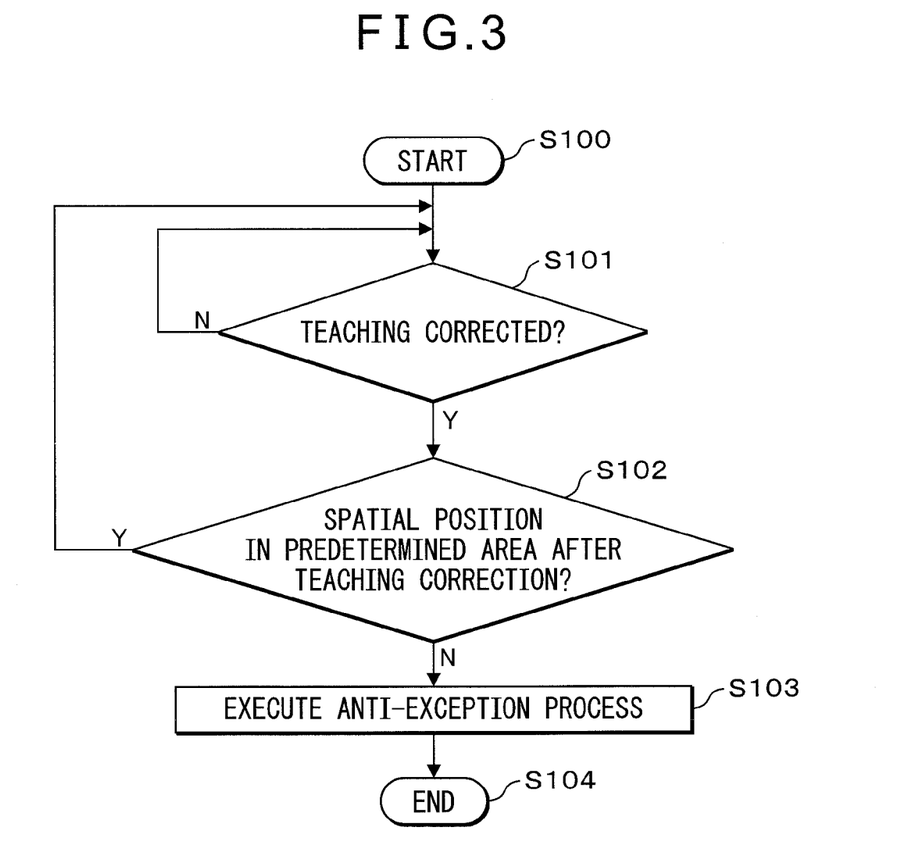
FIG. 3 is a flowchart showing the operation flow of the robot with a learning control function according to the first embodiment of the invention.

Next, the operation steps of the robot with a learning control function according to the first embodiment are explained. FIG. 3 is a flowchart for explaining the flow of operation of the robot with a learning control function according to the first embodiment. First, in step S101, the anti-exception processing unit 5 constantly monitors the task program stored in the RAM 34 of the learning controller 32 during execution of a learning operation or an actual operation of the robot mechanism unit 1. In the case where the task program is changed, step S101 determines whether the correction of the task program is teaching correction or not. In the case where step S101 determines that the correction of the task program is not the teaching correction, the original state is restored. In the process, the correction of the task program is determined as that of the teaching in the case where the data of the task program related to the operation of the robot mechanism unit is changed. In the case where other data is corrected, the correction is determined to not be the teaching correction.

Upon determination that the correction of the task program is the teaching correction, step S102 determines whether the spatial position of the robot mechanism unit after the teaching correction process stored in the task program is located or not in a predetermined area with reference to the spatial position of the robot mechanism unit before the teaching correction process. Specifically, step S102 determines whether the spatial position of the robot mechanism unit after the teaching correction process exists in the area defined by a solid such as an ellipsoid, a sphere, a parallelepiped, a cube or a polyhedron with the center thereof located at a position before the teaching correction process. This determination is intended to satisfy the condition described below. Specifically, in the case where the correction amount of the teaching correction is small, the robot mechanism unit is affected to such a small degree as to determine that the anti-exception process is not required. Only in the case where the correction amount of the teaching correction is large, the anti-exception process is executed. By doing so, the unnecessary anti-exception process can be avoided in the case where the teaching correction amount is so small that the robot mechanism unit is not affected. In the case where step S102 determines that the spatial position after the teaching correction process is located in a predetermined area, the anti-exception process is not executed and the original state is restored. Incidentally, in this case, the correction amount of the teaching correction is so small that the learning correction amount before correction can be used without relearning.

In the case where step S102 determines that the spatial position after the teaching correction process exceeds a predetermined area, the anti-exception process is executed in step S103. In the anti-exception process, the learning correction amount of the learning control unit is set to zero so that the operation can be started by decreasing the operation speed of the robot mechanism unit automatically to a level where no vibration occurs even in the case where the learning correction amount is zero. Therefore, even the teaching correction process, if executed, causes no vibration during the operation of the robot mechanism unit.

Figure 4:
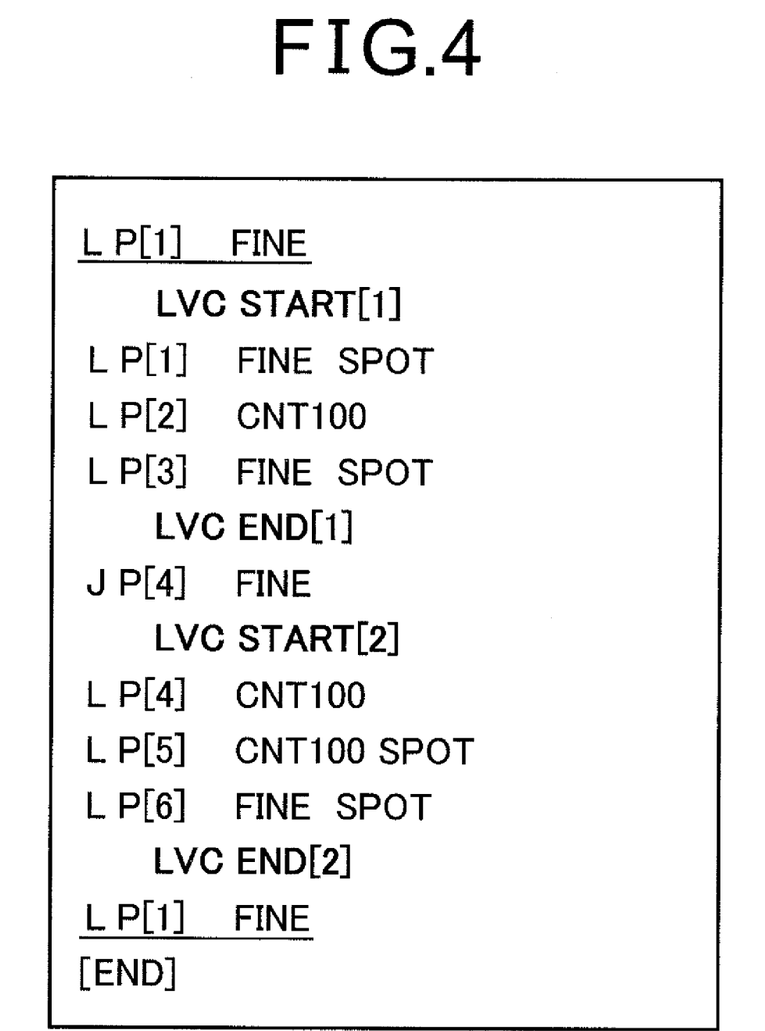
FIG. 4 is a diagram showing an example of the task program.

Next, the steps of determining whether the teaching correction process is executed or not are explained. FIG. 4 shows an example of the task program. The learning instruction is contained in modal form in the task program. The learning control of the robot mechanism unit is carried out in the range of LVC (Learning Vibration Control) START[1] to LVC END [1] and LVC START[2] to LVC END[2], and the determination is made as to whether the teaching correction process is carried out or not in this range.

Figure 5:
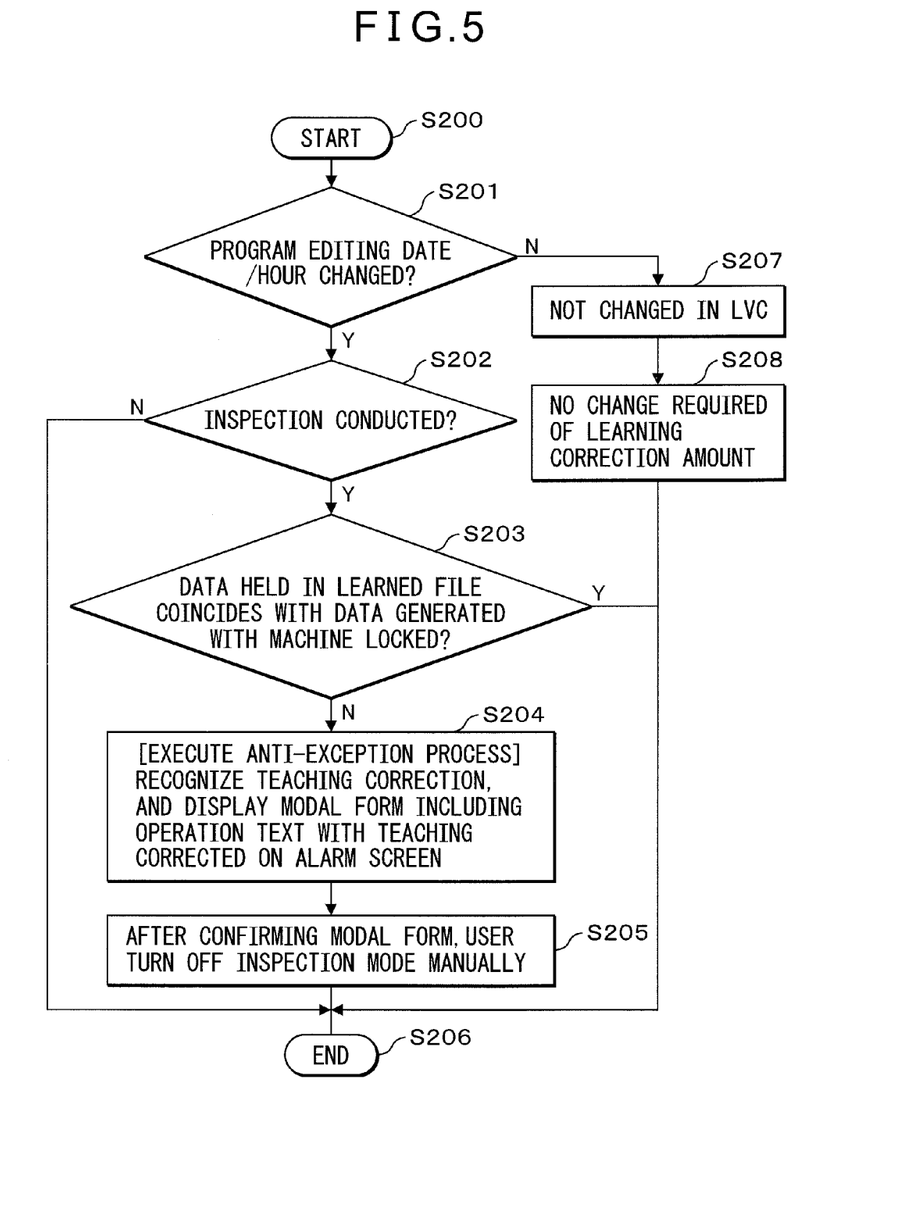
FIG. 5 is a flowchart showing the flow of the confirmation steps to check whether the teaching correction exists or not in the case where teaching correction process is executed during the learning operation.

The teaching correction process may be carried out during both the learning operation and the actual operation after learning. First, the steps of determining whether the teaching is corrected or not during execution of the learning operation process are explained. FIG. 5 is a flowchart showing the flow of the steps of confirming whether the teaching correction exists or not in the case where teaching correction process is executed during the learning operation. First, in the case where the task program is changed, the anti-exception processing unit 5 determines in step S201 whether the program editing date/hour is changed or not. This determination is made by the anti-exception processing unit 5 constantly monitoring the content of the task program in the RAM 34 as shown in FIG. 2. In the case where the program editing date/hour is not changed, the anti-exception processing unit 5 determines in step S207 that no change is made in LVC. Next, in step S208, the anti-exception processing unit 5 determines that the change in the learning correction amount is not required and ends the process.

The anti-exception processing unit 5, upon determination in step S201 that the program editing date/hour is changed, on the other hand, makes an inquiry in step S202 as to whether the inspection is conducted or not to check whether the teaching correction process is executed or not. For example, the wording is displayed on the display unit (not shown) "The program is changed from the time of generation of the learned data. The inspection of the learned data is required, and an inspection mode will be entered with the machine locked. In this state, the inspection can be conducted by executing the program. Do you wish to execute the program?". In the case where the inspection is conducted, the anti-exception processing unit 5 determines in step S203 whether the data held in the learned file coincides with the data generated with the machine locked. In the case where both data coincide with each other, the anti-exception processing unit 5 determines that the teaching correction process is not executed, and the process is ended. In the case where the user recognizes the necessity of the repeated teaching, the inspection is not conducted in step S202 but the modal portion changed is learned again as described below.

The anti-exception processing unit 5, upon determination in step S203 that the data held in the learned file fails to coincide with the data generated with the machine locked, determines in step S204 that the teaching correction process is executed and executes an anti-exception process. Specifically, in order to cause the user to recognize the teaching correction, the anti-exception processing unit 5 displays the modal form including the operation text with the teaching corrected on the alarm screen of the display unit. Furthermore, in step S205, the user turns off the inspection mode manually after checking the modal form in step S205. At the same time, the machine is automatically unlocked.

As described above, in the case where the task program is corrected during the learning operation, the anti-exception processing unit 5 determines whether the particular correction is the teaching correction, and upon determination that the teaching correction process is executed, executes the anti-exception process.

Figure 6:
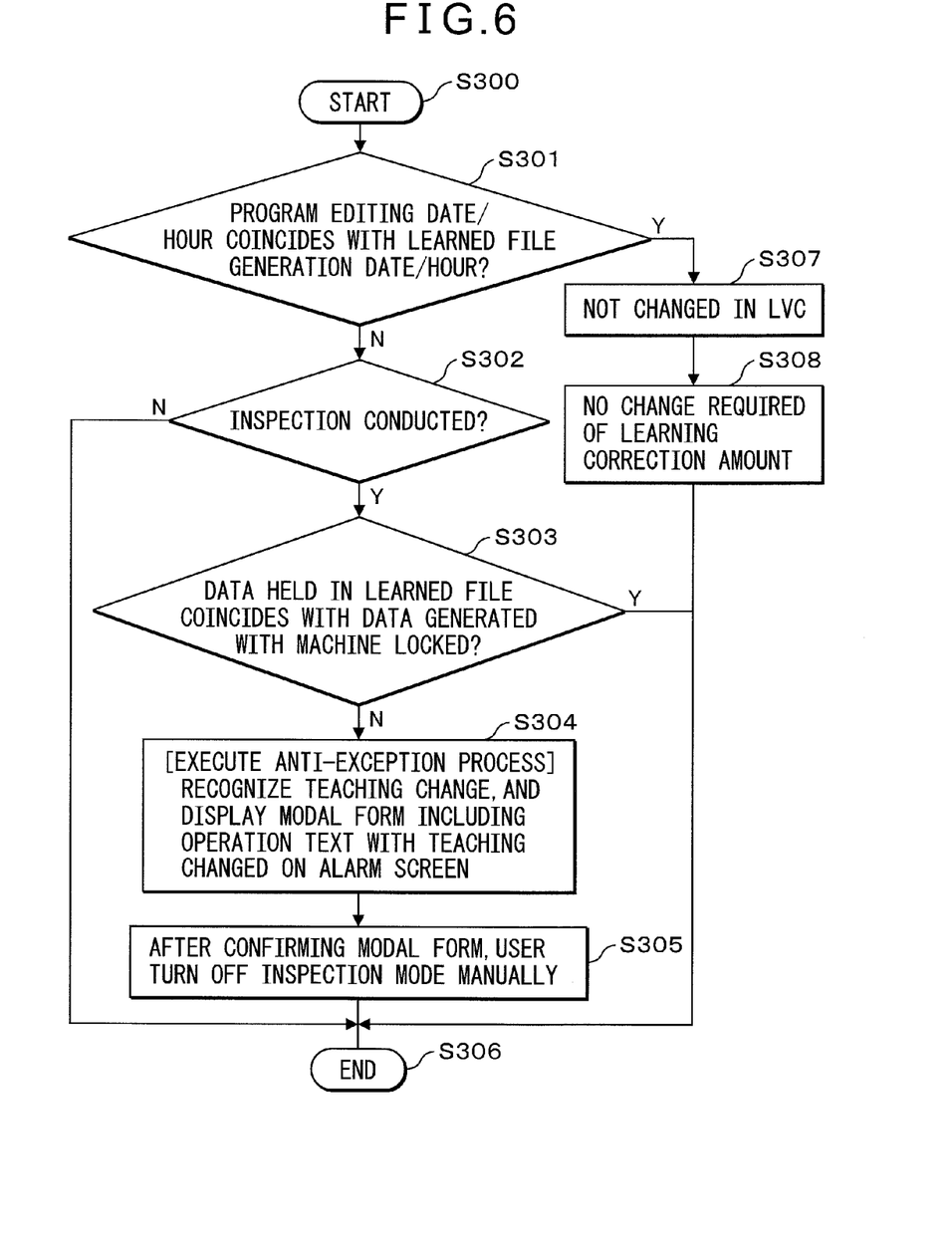
FIG. 6 is a flowchart showing the flow of the confirmation steps to check whether the teaching correction exists or not in the case where teaching correction process is executed during the actual operation after learning.

Next, the steps of determining whether the teaching correction process exists or not during execution of an actual operation after learning are explained. FIG. 6 is a flowchart showing the flow of the steps of checking whether the teaching correction exists or not in the case where teaching correction process is executed during the actual operation after learning. First, in step S301, the anti-exception processing unit 5 constantly monitors the task program stored in the RAM 34 of the learning controller 32, and in the case where the task program is changed, determines whether the program editing date/hour coincides with the date/hour of generation of the learned file. This is in order to determine whether the program is corrected or not after learning. The anti-exception processing unit 5, upon determination that the program editing date/hour coincides with the date/hour of generation of the learned file, determines in step S307 that no change occurs in the LVC. Further, the anti-exception processing unit 5 determines in step S308 that the change of the learning correction amount is not required, and the process is ended.

The anti-exception processing unit 5, upon determination in step S301 that the program editing date/hour fails to coincide with the date/hour of generation of the learned file, on the other hand, makes an inquiry in step S302 as to whether the inspection is to be conducted or not in order to confirm that the teaching is corrected or not. The subsequent processes of steps S303 to S305 are identical to the steps S203 to S205 of determining whether the teaching is corrected or not during the learning operation described above, and therefore is not explained in detail.

According to this embodiment, the determination as to whether the teaching is corrected or not can be made also in the case where the task program is corrected during execution of a learning operation or an actual operation of the robot with a learning control function 100, and in the case where the teaching correction corresponds to the exception process, the anti-exception process can be executed.

Embodiment 2

Figure 7:
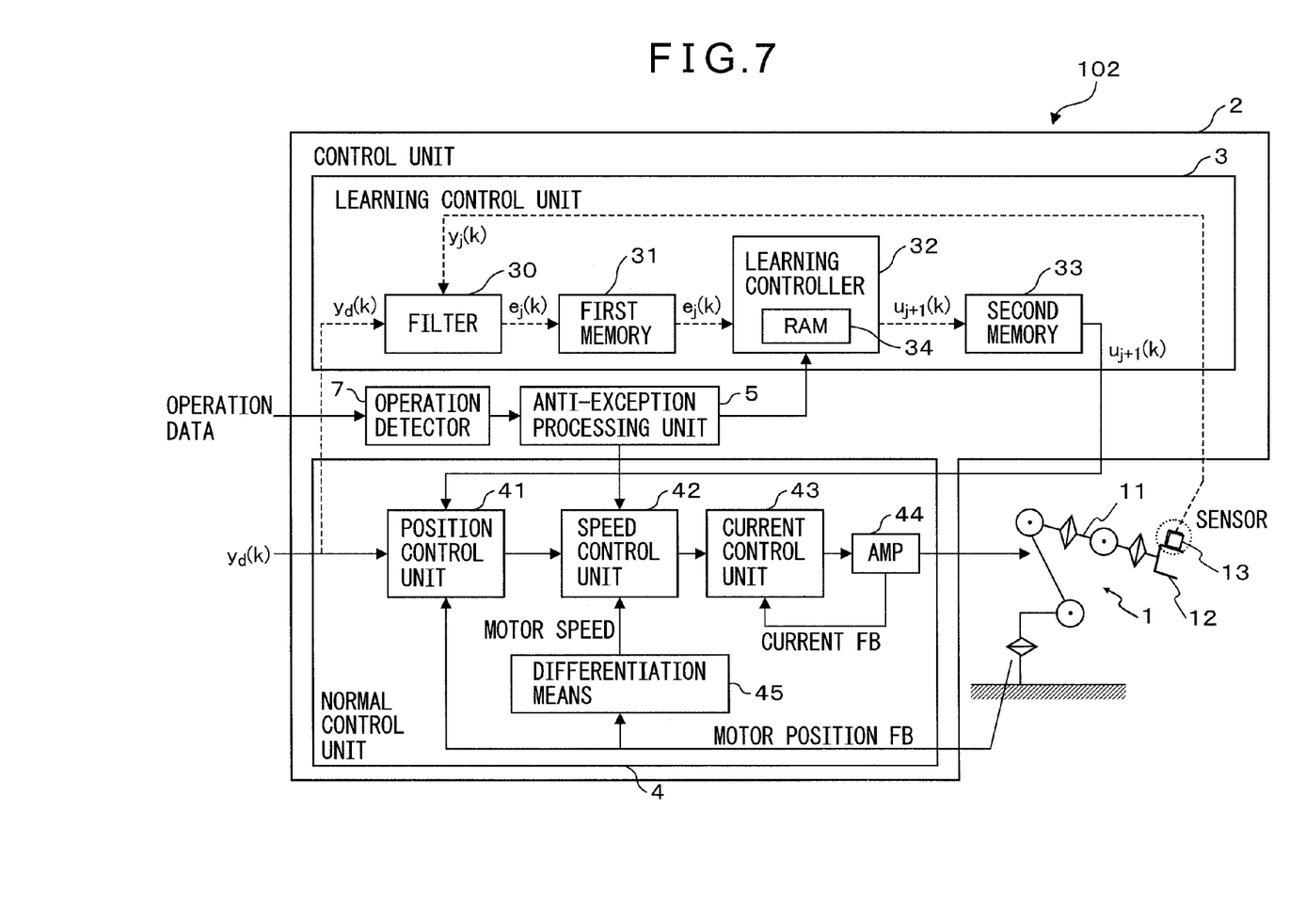
FIG. 7 is a diagram showing the configuration of the robot with a learning control function according to second and third embodiments of the invention.

Next, the robot with a learning control function according to a second embodiment of the invention is explained. FIG. 7 shows the configuration of the robot with a learning control function according to the second embodiment of the invention. The robot with a learning control function 102 according to the second embodiment of the invention includes a robot mechanism unit 1, a learning control unit 3 for obtaining data on positional deviation of the robot mechanism unit 1 upon execution of a task program and executing a learning control for calculating a learning correction amount for decreasing the positional deviation of the robot mechanism unit 1 below a certain value and a normal control unit 4 for executing a learning operation for operating the robot mechanism unit 1 in order to obtain the data during the learning control and executing an actual operation for operating the robot mechanism unit 1 based on the learning correction amount calculated by the learning control unit 2 after executing the learning control. This robot with a learning control function is different in configuration from the conventional robot with a learning control function shown in FIG. 1 in that the robot according to the second embodiment further includes an anti-exception processing unit 5 and an operation detection unit 7 in the control unit 2, and that the anti-exception process is executed in the case where the robot is provisionally stopped during execution of a learning operation or an actual operation of the robot mechanism unit 1. The operation detection unit 7 receives operation data from the outside of the robot with a learning control function 102. The Operation data includes data which represents presence or absence of command to provisionally stop and data which represents presence or absence of command to resume after provisional stop.

The other points of the configuration of the robot with a learning control function 102 are similar to those of the configuration shown in the first embodiment, and therefore are not described in detail.

In the case where a command is issued to provisionally stop the robot mechanism unit 1 during execution of a learning operation or an actual operation of the robot mechanism unit 1, the data received by the operation detection unit 7 includes data which represents presence of command to provisionally stop of the robot mechanism unit 1. The operation detection unit 7 detects presence of command to provisionally stop of the robot mechanism unit 1 based on the received operation data and notifies the anti-exception processing unit 5 accordingly. The anti-exception processing unit 5 determines that the exception process is executed based on the command to provisionally stop of the robot mechanism unit 1 and executes the anti-exception process. The anti-exception process is executed, for example, by decreasing the operation speed of the robot mechanism unit to a predetermined safe level and setting the learning correction amount to zero. Specifically, the anti-exception processing unit 5 controls the speed control unit 42 and thus decreases the operation speed of the robot mechanism unit to a predetermined safe level while at the same time setting the learning correction amount in the second memory 33 to zero.

Figure 8:
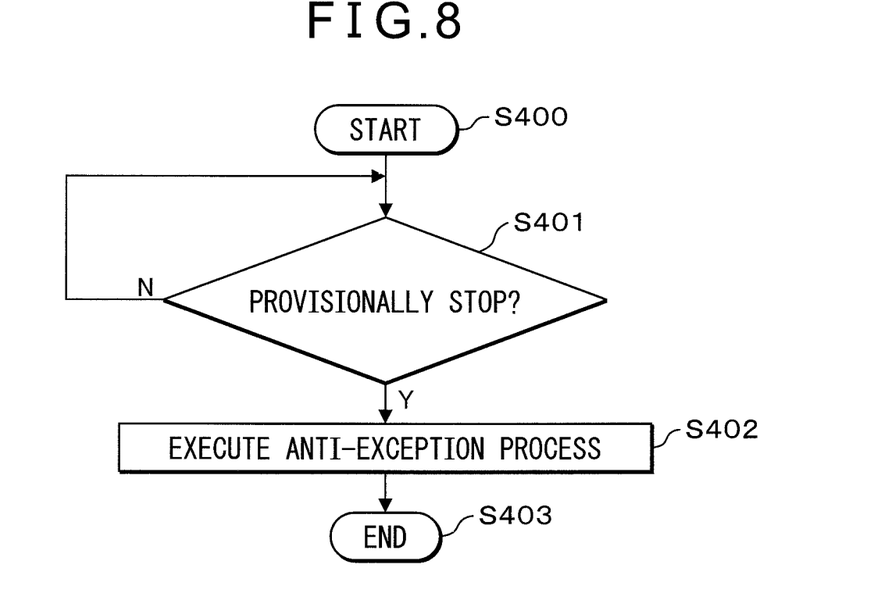
FIG. 8 is a flowchart showing the operation flow of the robot with a learning control function according to the second embodiment of the invention.

Next, the steps of the operation of the robot with a learning control function according to the second embodiment are explained. FIG. 8 is a flowchart explaining the operation flow of the robot with a learning control function according to the second embodiment. First, the anti-exception processing unit 5 determines in step S401 whether a provisional stop command is issued or not to the robot mechanism unit 1 during execution of a learning operation or an actual operation of the robot mechanism unit 1. Specifically, the operation detection unit 7 constantly monitors the operation of the robot mechanism unit 1 based on received operation data, and determines whether a command is issued to provisionally stop the robot mechanism unit 1 or not. In the case where such a command is so issued, the anti-exception processing unit 5 is notified. In the case where the anti-exception processing unit 5 determines that the provisional stop command is not notified and exception process is not executed, the original state is restored. The anti-exception processing unit 5, upon determination that the provisional stop command is notified and exception process is executed, on the other hand, executes the anti-exception process in step S402. The anti-exception process is executed by the anti-exception processing unit 5 in such a manner that while the learning correction amount of the learning control unit is set to zero, the speed control unit 42 is controlled to decrease the operation speed of the robot mechanism unit automatically to a level causing no vibration even in the case where the learning correction amount is zero, followed by the stop process. As a result, no vibration is generated during the operation of the robot mechanism unit 1 in spite of the provisional stop process.

Embodiment 3

Next, the robot with a learning control function according to a third embodiment of the invention is explained. The configuration of the robot according to the third embodiment is similar to that of the second embodiment. The third embodiment is different from the second embodiment in that according to the third embodiment, the anti-exception process is executed in the case where command to resume the operation after provisional stop of the robot mechanism unit 1 is issued. In the case where a command is issued to resume the operation of the robot mechanism unit 1 after being provisionally stopped during execution of a learning operation or an actual operation of the robot mechanism unit 1, the data received by the operation detection unit 7 includes data which represents presence of command to resume after provisional stop of the robot mechanism unit 1. The operation detection unit 7 detects presence of command to resume after provisional stop of the robot mechanism unit 1 based on the received operation data the command and notifies the anti-exception processing unit 5 accordingly. The anti-exception processing unit 5 determines that the exception process is executed based on the command to resume after provisional stop of the robot mechanism unit 1 and executes the anti-exception process. As an example of the anti-exception process, the operation speed of the robot mechanism unit is decreased to a predetermined safe level and the learning correction amount set to zero. Specifically, the anti-exception processing unit 5 decreases the operation speed of the robot mechanism unit to a value not casing any vibration even in the case where the learning correction amount is zero, and sets the learning correction amount to zero in the second memory 33, after which the operation is started. Even in the case where the operation is resumed after provisional stop, no vibration occurs during the operation of the robot mechanism.

Figure 9:
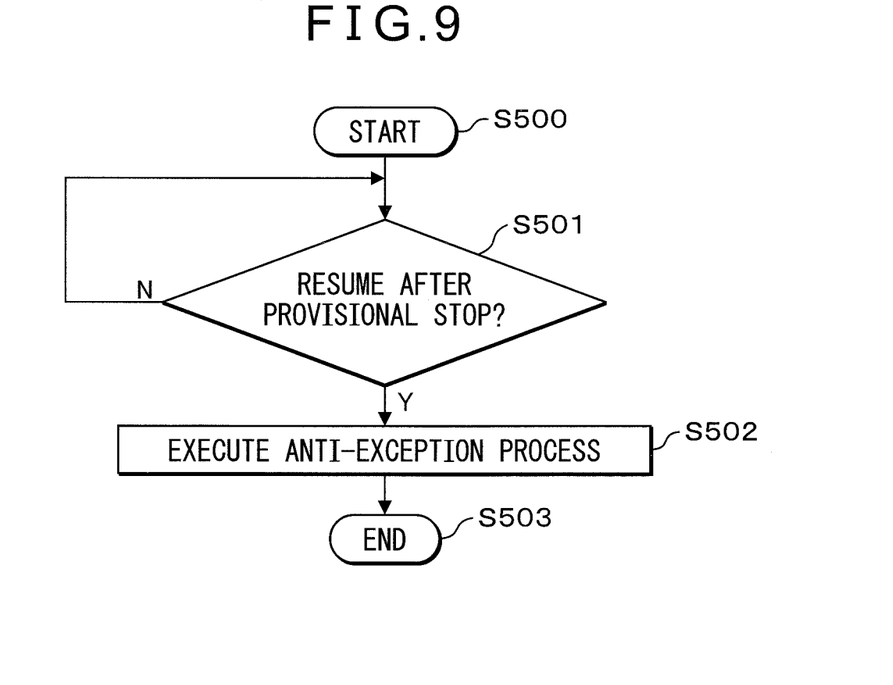
FIG. 9 is a flowchart showing the operation flow of the robot with a learning control function according to the third embodiment of the invention.

Next, the steps of operation of the robot with a learning control function according to the third embodiment are explained. FIG. 9 is a flowchart explaining the operation flow of the robot with a learning control function according to the third embodiment. First, the anti-exception processing unit 5 determines in step S501 whether a command is issued or not to the robot mechanism unit 1 to resume the operation after provisional stop during execution of a learning operation or an actual operation of the robot mechanism unit 1. Specifically, the operation detection unit 7 constantly monitors the operation of the robot mechanism unit 1, and determines whether a command to resume the operation is issued or not to the robot mechanism 1 after provisional stop based on the received operation data. In the case where the command to resume after provisional stop is issued, the anti-exception processing unit 5 is notified. In the case where the anti-exception processing unit 5 determines that the command to resume the operation after provisional stop is not notified and exception process is not issued, the original state is restored. The anti-exception processing unit 5, upon determination that the command to resume the operation after provisional stop is notified and the exception process is issued, on the other hand, executes the anti-exception process in step S502. As an example of the anti-exception process, the learning correction amount of the learning control unit is set to zero and the operation speed of the robot mechanism unit is decreased automatically to a level causing no vibration even in the case where the learning correction amount is zero, followed by resuming the operation. Even in the case where the operation is resumed after provisional stop, no vibration is generated during the operation of the robot mechanism unit.

Embodiment 4

Figure 10:
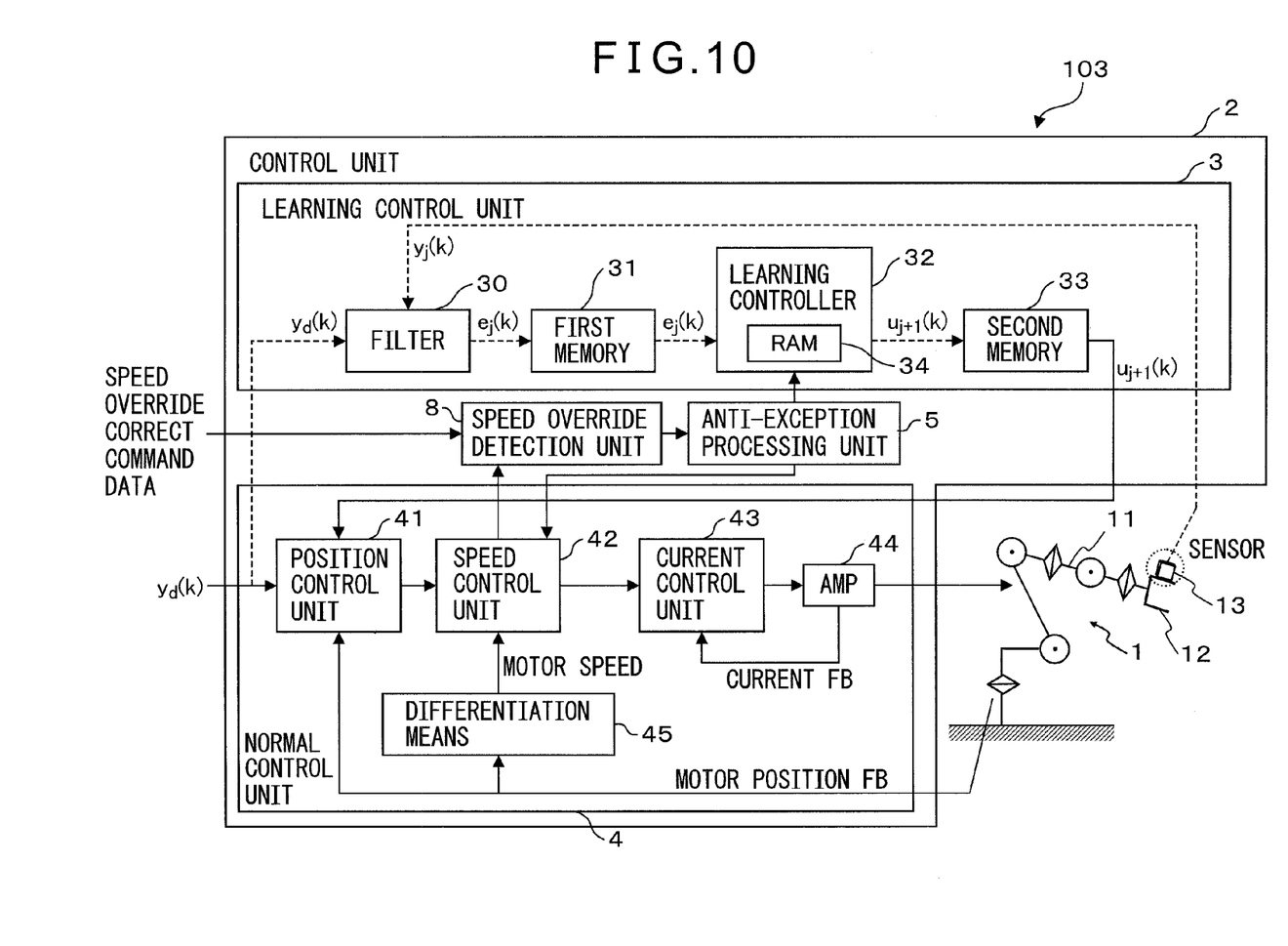
FIG. 10 is a diagram showing the configuration of the robot with a learning control function according to a fourth embodiment of the invention.

Next, the robot with a learning control function according to a fourth embodiment of the invention is explained. FIG. 10 shows the configuration of the robot with a learning control function according to the fourth embodiment of the invention. The robot with a learning control function 103 according to the fourth embodiment of the invention includes a robot mechanism unit 1, a learning control unit 3 for obtaining data on positional deviation of the robot mechanism unit 1 upon execution of a task program and executing a learning control for calculating a learning correction amount for decreasing the positional deviation of the robot mechanism unit 1 below a certain value and a normal control unit 4 for executing a learning operation for operating the robot mechanism unit 1 in order to obtain the data during the learning control and executing an actual operation for operating the robot mechanism unit 1 based on the learning correction amount calculated by the learning control unit 2 after executing the learning control. The configuration of this robot with a learning control function is different from that of the conventional robot with a learning control function in that the robot with a learning control function 103 according to the fourth embodiment further includes an anti-exception processing unit 5 and a speed override detection unit 8 in the control unit 2. According to the fourth embodiment, the anti-exception process is executed in the case where the speed override is changed by the robot control unit of the robot during execution of a learning operation or an actual operation of the robot mechanism unit 1. "Speed override" means scale factor for multiplying to predetermined operating speed of a robot mechanism unit in order to adjust the speed. According to the fourth embodiment, the speed override detection unit 8 constantly monitors the speed control unit 42. In the case where the speed override is changed, the speed override detection unit 8 detects it, and notifies the anti-exception processing unit 5. The anti-exception processing unit 5 determines that the exception process is executed and executes the anti-exception process. As an example of the anti-exception process, the operation speed of the robot mechanism unit is decreased to a predetermined safe level and the learning correction amount set to zero. Specifically, the anti-exception processing unit 5 decreases the operation speed of the robot mechanism unit to a predetermined safe value by controlling the speed control unit 42, while at the same time setting the learning correction amount to zero in the second memory 33. The remaining parts of the configuration of the robot with a learning control function 103 are similar to the corresponding parts of the configuration of the first embodiment, and therefore are not explained in detail.

Figure 11:
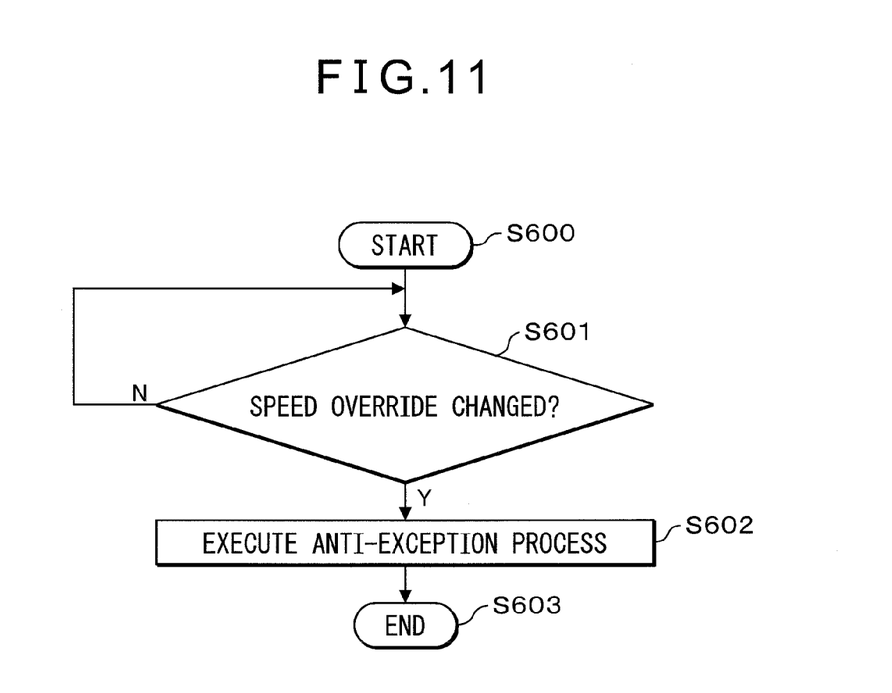
FIG. 11 is a flowchart showing the operation flow of the robot with a learning control function according to the fourth embodiment of the invention.

Next, the steps of operation of the robot with a learning control function according to the fourth embodiment are explained. FIG. 11 is a flowchart explaining the operation flow of the robot with a learning control function according to the fourth embodiment. First, the anti-exception processing unit 5 determines in step S601 whether the speed override is changed or not for the speed control unit 42 during execution of a learning operation or an actual operation of the robot mechanism unit 1. Specifically, the speed override detection unit 8 constantly monitors the speed control unit 42, and determines whether the speed override is changed or not. In the case where the speed override is changed, the speed override detection unit 8 notifies the anti-exception processing unit 5. In the case where the anti-exception processing unit 5 determines that the speed override is not changed, the original state is restored. The anti-exception processing unit 5, upon determination that the speed override is changed, on the other hand, executes the anti-exception process in step S602. As an example of the anti-exception process, the learning correction amount of the learning control unit is set to zero, and by controlling the speed control unit 42, the operation is continued while decreasing the operation speed of the robot mechanism unit automatically to a level causing no vibration even in the case where the learning correction amount is zero. In spite of a change in the speed override, no vibration is generated during the operation of the robot mechanism unit.

Embodiment 5

Figure 12:
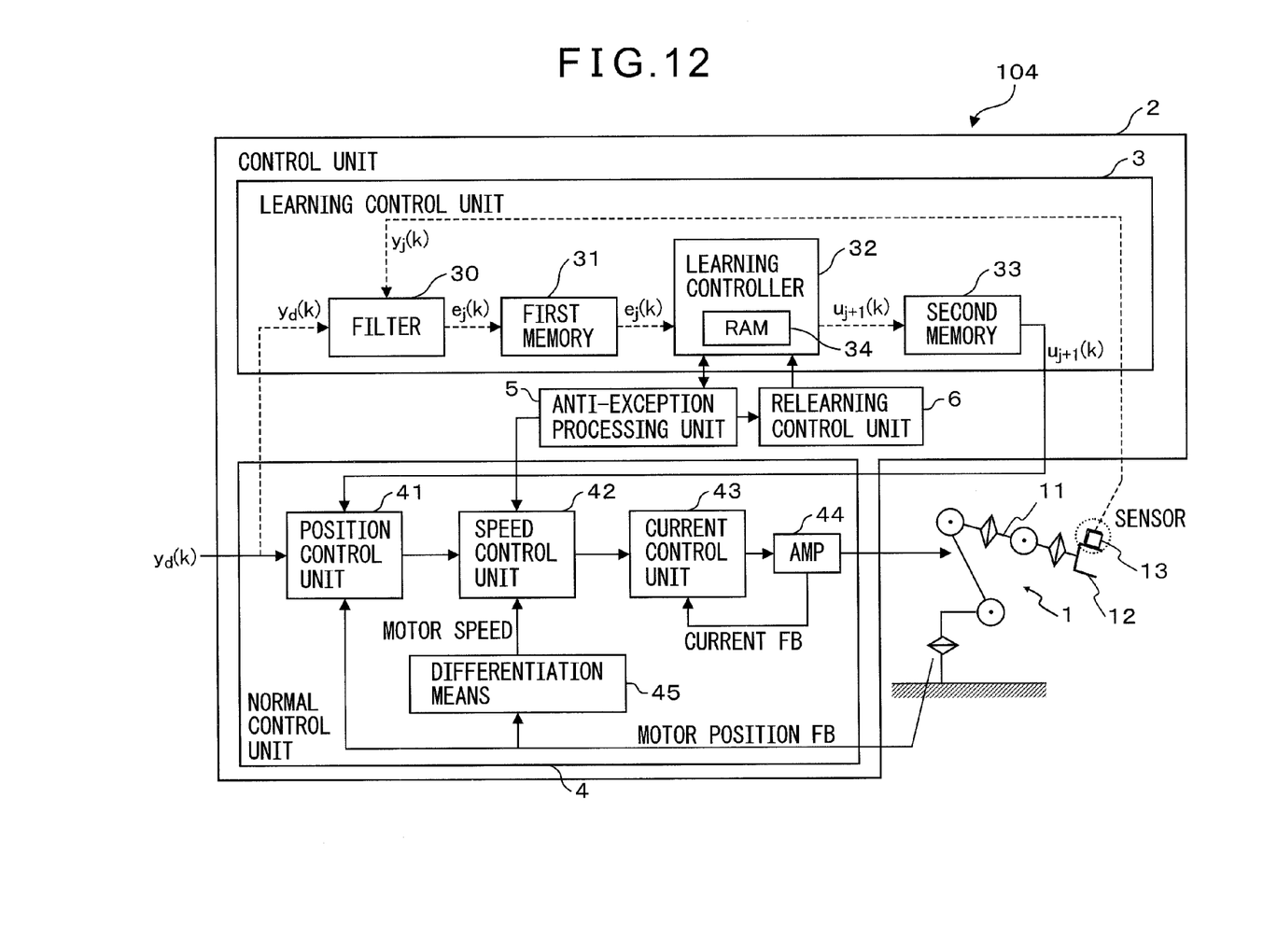
FIG. 12 is a diagram showing the configuration of the robot with a learning control function according to a fifth embodiment of the invention.

Next, the robot with a learning control function according to a fifth embodiment of the invention is explained. FIG. 12 shows the configuration of the robot with a learning control function according to the fifth embodiment of the invention. The robot with a learning control function 104 according to the fifth embodiment of the invention includes a robot mechanism unit 1, a learning control unit 3 for obtaining data on positional deviation of the robot mechanism unit 1 upon execution of a task program and executing a learning control for calculating a learning correction amount for decreasing the positional deviation of the robot mechanism unit 1 below a certain value and a normal control unit 4 for executing a learning operation for operating the robot mechanism unit 1 in order to obtain the data during the learning control and executing an actual operation for operating the robot mechanism unit 1 based on the learning correction amount calculated by the learning control unit 2 after executing the learning control. The configuration of this robot with a learning control function is different from that of the robot with a learning control function according to the first embodiment shown in FIG. 2 in that the robot according to the fifth embodiment further includes relearning control unit 6 in the control unit 2 and the relearning is made after execution of the anti-exception process for the robot with a learning control function. According to the fifth embodiment, after the exception process is effected on the robot followed by execution of the anti-exception process during execution of a learning operation or an actual operation of the robot mechanism unit 1, the anti-exception processing unit 5 notifies the relearning control unit 6. The relearning control unit 6 controls the learning control unit 32. The remaining parts of the configuration of the robot with a learning control function 104 are similar to those of the first embodiment, and therefore are not explained in detail.

Figure 13:
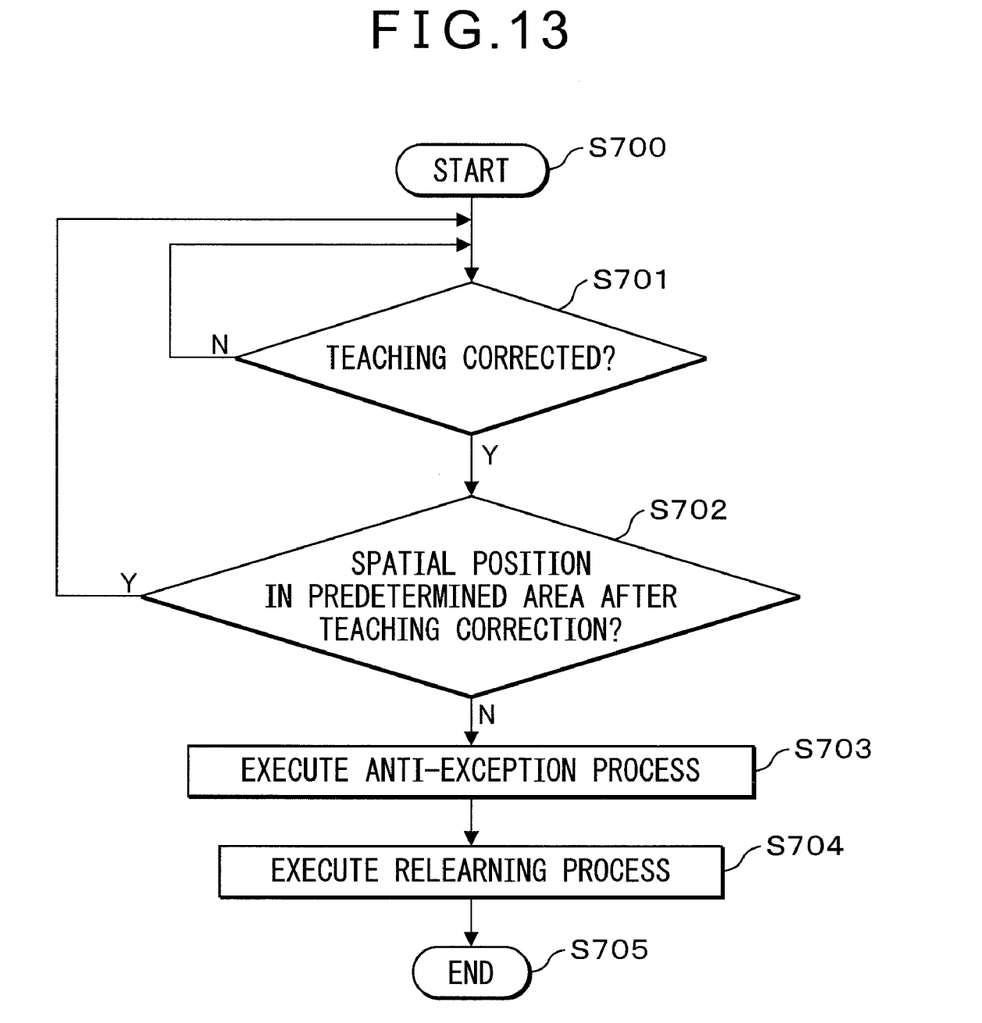
FIG. 13 is a flowchart showing the operation flow of the robot with a learning control function according to the fifth embodiment of the invention.

Next, the steps of operation of the robot with a learning control function according to the fifth embodiment are explained. FIG. 13 is a flowchart explaining the operation flow of the robot with a learning control function according to the fifth embodiment. Steps S700 to S703 are similar to steps S100 to S103 of the first embodiment, and therefore are not explained in detail. In step S704, the relearning process is executed after an anti-exception process. Specifically, the anti-exception processing unit 5 notifies the completion of the anti-exception process to the relearning control unit 6. After that, the relearning control unit 6 controls the learning controller 32 so that the learning correction amount is recalculated by the relearning process. In this way, even in the case where the teaching is corrected as an exception process and the anti-exception process is executed, the proper learning correction amount can be obtained by relearning. Thus, the robot mechanism unit can be operated normally. According to this embodiment, it is illustrated by an example that relearning process is executed after an anti-exception process executed when teaching correction is performed as an exception process. Nevertheless, the relearning process may be executed after anti-exception processes executed when provisionally stopping process, resuming the learning process after a provisional stop or changing in the speed override.

What is claimed is:

1. A robot with a learning control function comprising:
    a robot mechanism unit;
    a learning control unit for obtaining data on positional deviation of said robot mechanism unit upon execution of a task program and executing a learning control for calculating a learning correction amount in order to decrease said positional deviation of said robot mechanism unit below a certain value; and
    a normal control unit for executing a learning operation of said robot mechanism unit in order to obtain said data on positional deviation during said learning control and executing an actual operation of said robot mechanism unit based on said learning correction amount calculated by said learning control unit after executing said learning control;

wherein said learning control unit repeats a process until positional deviation decreases to less than or equal to a predetermined value, said process includes executing said learning operation, calculating learning correction amount based on obtained data on positional deviation, executing next learning operation by using said calculated learning correction amount, and calculating new learning correction amount based on obtained data on positional deviation, and wherein said robot further includes an anti-exception processing unit for executing an anti-exception process in the case where an exception process occurs during said learning operation or said actual operation, said anti-exception process is process for decreasing of operation speed of said robot mechanism unit to a predetermined safe speed and setting said learning correction amount to zero.

2. The robot with a learning control function according to claim 1,
wherein said exception process is teaching correction process for said task program.

3. The robot with a learning control function according to claim 1,
wherein said exception process is provisionally stopping process of said learning operation or said actual operation.

4. The robot with a learning control function according to claim 1,
wherein said exception process is resuming process of said learning operation or said actual operation after provisional stop.

5. The robot with a learning control function according to claim 1,
wherein said exception process is changing process of speed override during said learning operation or said actual operation.

6. The robot with a learning control function according to claim 2,
wherein said anti-exception process is not executed in the case where spatial position of said robot mechanism unit after said teaching correction process exists in a predetermined area with reference to spatial position of said robot mechanism unit before said teaching correction process.

7. The robot with a learning control function according to claim 6,
wherein said predetermined area is defined by a solid including an ellipsoid, a sphere, a parallelepiped, a cube or a polyhedron with the center thereof located at a position before said teaching correction process.

8. The robot with a learning control function according to claim 1,
wherein said learning control unit further includes a relearning control unit for executing said learning control again and recalculating said learning correction amount.

* * * * *